(12) United States Patent
Hirooka et al.

(10) Patent No.: US 6,832,474 B2
(45) Date of Patent: Dec. 21, 2004

(54) EXHAUST GAS PURIFICATION DEVICE OF INTERNAL COMBUSTION ENGINE AND METHOD THEREFORE

(75) Inventors: Shigemasa Hirooka, Susono (JP); Mamoru Yoshioka, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/617,869

(22) Filed: Jul. 14, 2003

(65) Prior Publication Data

US 2004/0020189 A1 Feb. 5, 2004

(30) Foreign Application Priority Data

Jul. 30, 2002 (JP) ........................................ 2002-221638

(51) Int. Cl.[7] ................................................ F01N 3/00
(52) U.S. Cl. ............................. 60/289; 60/274; 60/284
(58) Field of Search ........................... 60/284, 285, 289, 60/290

(56) References Cited

U.S. PATENT DOCUMENTS

| | | | | |
|---|---|---|---|---|
| 5,285,639 A | * | 2/1994 | Araki et al. ................... | 60/274 |
| 5,404,717 A | * | 4/1995 | Nogi et al. .................... | 60/274 |
| 5,461,857 A | * | 10/1995 | Itou et al. ...................... | 60/276 |
| 5,577,383 A | * | 11/1996 | Kuroda et al. ................. | 60/284 |
| 5,666,804 A | * | 9/1997 | Sekiya et al. .................. | 60/284 |
| 5,946,907 A | * | 9/1999 | Nagaishi et al. .............. | 60/284 |
| 6,463,732 B2 | * | 10/2002 | Baeuerle et al. .............. | 60/274 |

FOREIGN PATENT DOCUMENTS

| JP | A 59-200855 | 11/1984 |
|---|---|---|
| JP | A 4-362213 | 12/1992 |

* cited by examiner

*Primary Examiner*—Thomas Denion
*Assistant Examiner*—Diem Tran
(74) *Attorney, Agent, or Firm*—Oliff & Berridge, PLC

(57) ABSTRACT

Injection of secondary air (AI) into an exhaust gas pipe upstream of an exhaust gas purification catalyst is performed after a startup of an engine, in order to accelerate the warm-up of the catalyst. If the degree of catalyst warm-up during the AI is greater than or equal to a predetermined criterion degree of the warm-up and the engine output is greater than or equal to a criterion output, the injection of secondary air is stopped and exhaust gas purification on the catalyst is conducted so as to curb degradation of emissions.

9 Claims, 7 Drawing Sheets

EXHAUST GAS PURIFICATION DEVICE OF INTERNAL COMBUSTION ENGINE AND METHOD THEREFORE

INCORPORATION BY REFERENCE

The disclosure of Japanese Patent Application No. 2002-221638 filed on Jul. 30, 2002, including its specification, drawings and abstract, is incorporated herein by reference in its entirety.

BACKGROUND OF THE INVENTION

1. Field of the Invention

The invention relates to an exhaust gas purification device and method of an internal combustion engine and, more particularly, to an exhaust gas purification device of an internal combustion engine capable of curbing degradation of emissions even when the output of the engine increases during a catalyst warm-up.

2. Description of the Related Art

In internal combustion engines that use gasoline or the like as a fuel, a catalyst (e.g., a three-way catalyst, a nitrogen oxides storage-reduction catalyst, a catalyst having an oxidizing function, etc.) is disposed in an engine exhaust system so as to remove nitrogen oxides, hydrocarbons and carbon monoxide from exhaust gas.

In order to reduce nitrogen oxides and oxidize hydrocarbons and carbon monoxide on such a catalyst, it is necessary to keep the amount of oxygen stored in the catalyst at about half the limit amount of oxygen storage and control the air-fuel ratio of exhaust gas discharged from the internal combustion engine within a window around or near a stoichiometric air-fuel ratio.

Therefore, in order to control the exhaust gas air-fuel ratio at the stoichiometric air-fuel ratio, an air-fuel ratio sensor (an $O_2$ sensor or an A/F sensor) for detecting the air-fuel ratio of exhaust gas that is disposed at an inlet to the catalyst. Then, an air-fuel ratio feedback control for controlling the amount of fuel supplied to the engine on the basis of the output from the sensor is performed.

However, the catalyst is unable to normally perform its function unless the air-fuel ratio has been activated and the catalyst warm-up has been completed. Therefore, until the activation of the sensor and the warm-up of the catalyst are completed after a startup of the engine, the air-fuel ratio feedback control is prohibited and the warm-up of the catalyst is accelerated by dedicated measures.

In a conventionally employed procedure for accelerating the warm-up of a catalyst, injection of a secondary air into the exhaust pipe of the engine (hereinafter, referred to as "AI") is performed to increase the oxygen concentration in the exhaust gas and therefore accelerate oxidative reactions on the catalyst. The reaction heat thus produced accelerates the warm-up of the catalyst.

However, the catalyst warm-up cannot be immediately achieved, because a certain amount of time is needed before completion of the warm-up.

Therefore, in a situation immediately following a start of the AI operation where the catalyst warm-up has not sufficiently progressed and there is no effective performance of exhaust gas purification, it is required that the AI be continued in order to accelerate the catalyst warm-up even if the amount of exhaust gas increases due to an increased output of the engine when the vehicle is initially driven or the like.

However, in a situation where a considerable amount of time has elapsed following a start of the AI and the catalyst has partially acquired an exhaust gas purification capability, it is desirable that the AI be stopped to actively improve the quality of emissions if the amount of exhaust gas increases due to an increased engine output.

SUMMARY OF THE INVENTION

It is an object of the invention to provide an exhaust gas purification device of an engine capable of curbing degradation of emissions during a catalyst warm-up based on the AI operation by stopping the AI in accordance with the degree of catalyst warm-up if the output of the engine increases during the catalyst warm-up.

An exhaust gas purification device of an engine in accordance with a first aspect of the invention includes: a catalyst disposed in an exhaust gas pipe of the engine for purification of an exhaust gas; a secondary air injection device for injecting a secondary air into the exhaust gas pipe upstream of the catalyst so as to accelerate a warm-up of the catalyst at a time of a startup of the engine; a controller that: detects a degree of the warm-up of the catalyst with a warm up detection device; calculates a criterion output based on the degree of the warm-up detected by the warm-up detection device; detects an output of the engine with the output detection device; and stops injection of the secondary air with an injection stop device provided that: the degree of the warm-up detected by the warm-up detection device is greater than or equal to a predetermined criterion degree of the warm-up; and that the output of the engine detected by the output detection device is greater than or equal to the criterion output calculated by the controller.

According to the above-described construction, if the output of the engine becomes greater than or equal to a predetermined output during the secondary air injection (AI) operation, the AI is stopped provided that the warm-up of the catalyst has progressed to a certain degree.

In the above-described construction, the warm-up detection device may detect an accumulated value of an amount of flow of a primary air taken into the engine after the startup of the engine. Therefore, the degree of warm-up of the catalyst can be determined on the basis of the accumulated value of amount of intake air following the engine startup.

In the foregoing construction, the output detection device may detect the output of the engine based on a degree of opening of a throttle valve. Therefore, the engine output can be detected on the basis of the degree of opening of the throttle valve.

In the foregoing construction, the output detection device may detect the output of the engine based on an amount of intake air taken into the engine. Therefore, the output of the engine can be detected on the basis of the amount of intake air.

The exhaust gas purification device may further include a cooling water temperature detection device for detecting a temperature of a cooling water of the engine, wherein the controller corrects the criterion output and the criterion degree of the warm-up based on the temperature of the cooling water detected by the cooling water temperature detection device. Therefore, the criterion output and the criterion degree of the warm-up can be corrected on the basis of the cooling water temperature.

It is another object of the invention to provide a method for purifying an exhaust gas for an engine. This method includes: purifying the exhaust gas with a catalyst disposed in an exhaust gas pipe of the engine; injecting a secondary air into the exhaust gas pipe so as to accelerate a warm-up of the catalyst. A criterion output is calculated based on the degree of the warm-up detected, and an output of the engine is further detected. Injection of the secondary air is stopped such that the degree of the warm-up detected is greater than or equal to a predetermined criterion degree of the warm-up, and such that the output of the engine detected is greater than or equal to the criterion output calculated.

BRIEF DESCRIPTION OF THE DRAWINGS

The foregoing and further objects, features and advantages of the invention will become apparent from the following description of the preferred embodiments with reference to the accompanying drawings, wherein like numerals are used to represent like elements and wherein.

DETAILED DESCRIPTION OF THE PREFERRED EMBODIMENTS

Figure 1:
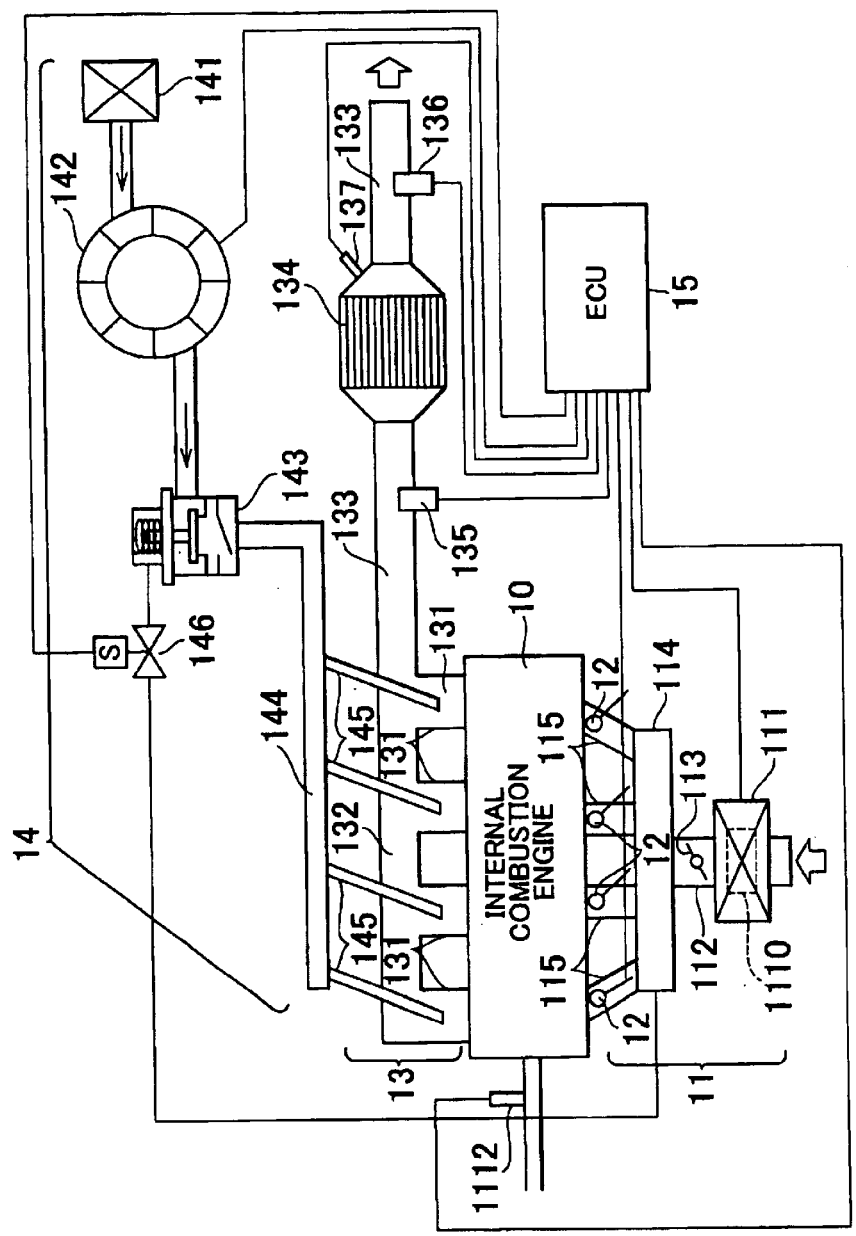
FIG. 1 is a diagram illustrating a construction of an exhaust gas purification device in accordance with an exemplary embodiment of the invention.

FIG. 1 is a diagram illustrating a construction of an exhaust gas purification device in accordance with an exemplary embodiment of the invention. In this construction, an internal combustion engine 10 is supplied with air from an intake system 11.

The intake system 11 includes an air filter 111 (having a built-in air flow meter 1110), an intake pipe 112, a throttle valve 113 disposed in the intake pipe 112, an intake manifold 114, intake branch pipes 115, etc. Each intake branch pipe 115 is provided with a fuel injection valve 12 for injecting fuel into the intake air.

Exhaust gas from the internal combustion engine 10 is discharged out of a vehicle via an exhaust system 13. The exhaust system 13 includes exhaust branch pipes 131, an exhaust manifold 132, an exhaust pipe 133, and a catalyst 134. An air-fuel ratio sensor 135 is disposed upstream of the catalyst 134. Another air-fuel ratio sensor 136 may be disposed downstream of the catalyst 134.

An exhaust gas temperature sensor 137 for detecting the temperature of exhaust gas let out of the catalyst is disposed at a downstream side of the catalyst 134.

An AI system 14 includes a secondary air filter 141, an electrically driven air pump 142 driven by a motor M, an air switching valve 143, a secondary air piping 144, secondary air injection pipes 145, etc.

The secondary air injection pipes 145 are connected to the exhaust branch pipes 131. The secondary air taken in via the secondary air filter 141 is injected into the exhaust branch pipes 131.

The air switching valve 143 is an actuator that controls the supply of secondary air, and is connected to the intake pipe 112 via a solenoid valve 146. The opening and closure of the air switching valve 143 is controlled via the negative pressure in the intake manifold 114.

That is, when the solenoid valve 146 is magnetized, negative pressure is supplied to the air switching valve 143, so that the air switching valve 143 is opened so as to inject secondary air into the exhaust branch pipes 131. When the magnetization of the solenoid is discontinued, the air switching valve 143 is closed to discontinue the supply of secondary air.

The exhaust gas purification device is controlled by an ECU 15 that is formed by a microcomputer.

In the illustrated embodiment, the controller (the ECU 15) is implemented as a programmed general purpose electronic control unit. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits, or devices (e.g., hardwired electronic or logic circuit such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine distributed processing architecture can be used for maximum data/signal processing capability and speed.

Figure 2:
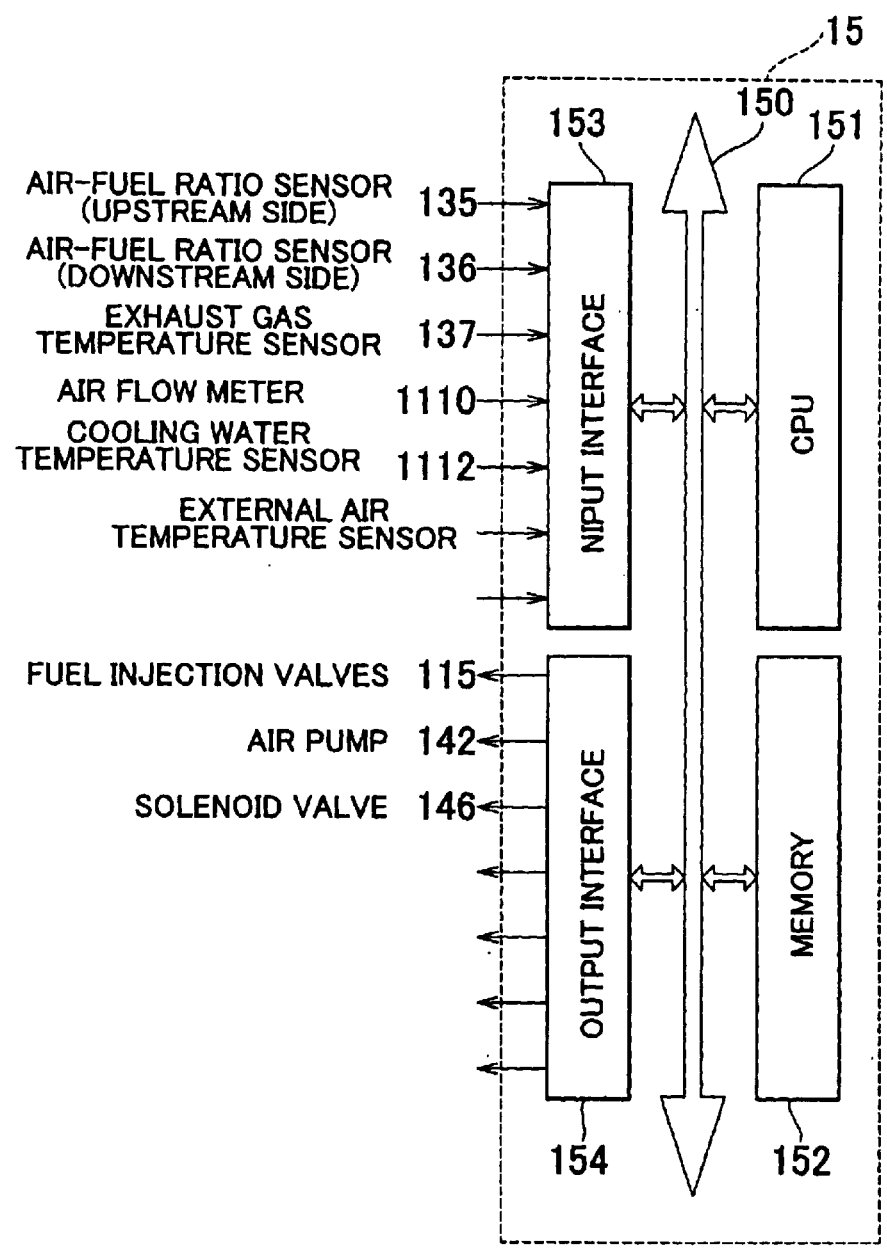
FIG. 2 is an illustration of a construction of an ECU.

FIG. 2 illustrates a construction of the ECU. The ECU 15 is made up of a CPU 151, a memory 152, an input interface 153, and an output interface 154 that are connected to a bus 150.

Via the input interface 153, the ECU 15 inputs the oxygen concentrations in exhaust gas detected by the air-fuel ratio sensors 135, 136, the temperature of exhaust gas detected by the exhaust gas temperature sensor 137, the amount of intake air detected by the built-in air flow meter 1110, and the temperature of cooling water detected by at least one cooling water temperature sensor 1112.

Via the output interface 154, the ECU 15 outputs operational signals to the fuel injection valves 12, the electrically driven air pump 142, and the solenoid valve 146.

Figure 3:
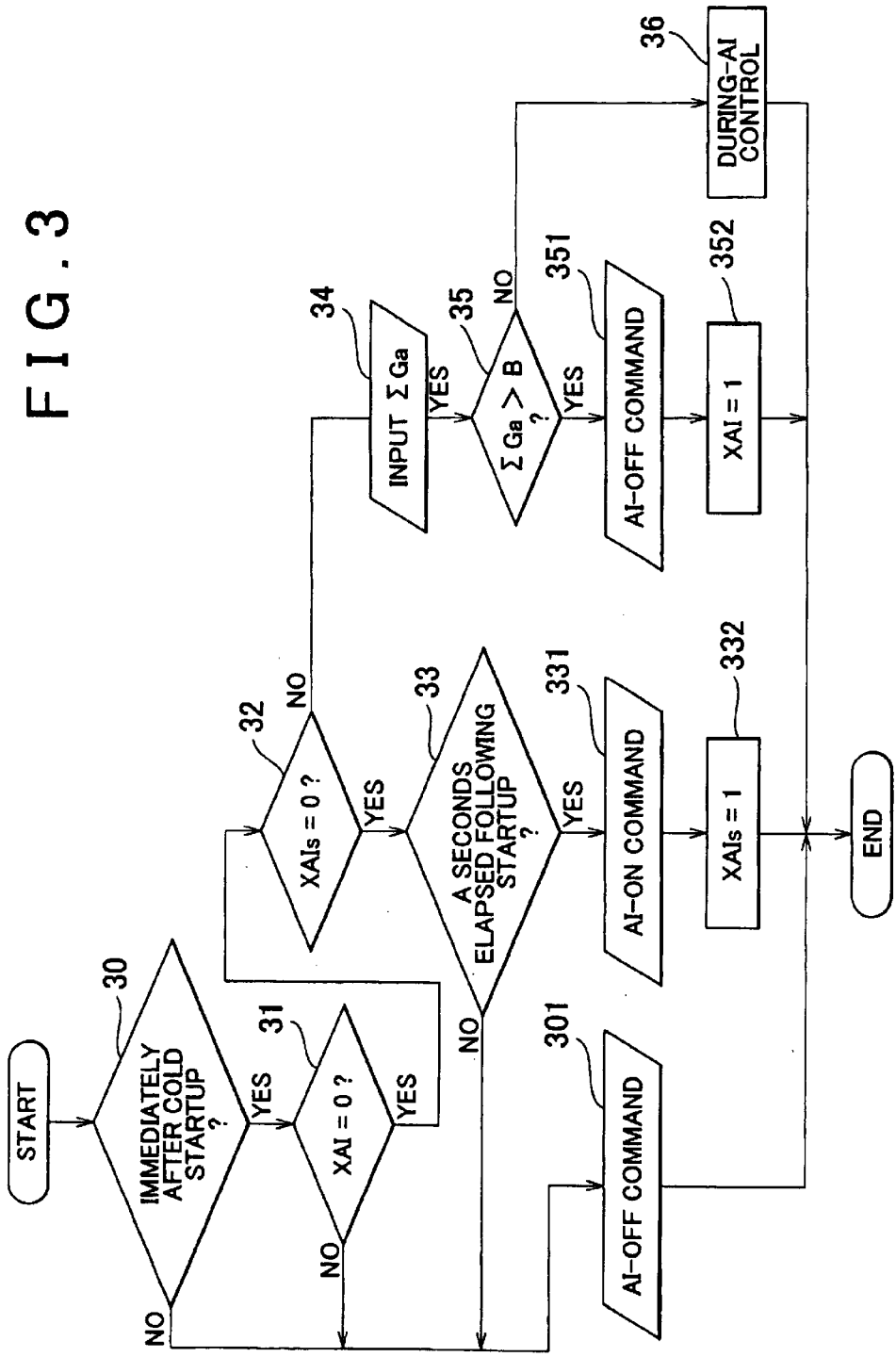
FIG. 3 is a flowchart illustrating an AI main routine.

FIG. 3 is a flowchart illustrating an AI main routine executed by the ECU 15. In step 30 in the routine, the ECU 15 determines whether the engine has just been started up in a cold state.

If an affirmative determination is made in step 30, that is, if a cold engine startup has just been conducted, the ECU 15 determines in step 31 whether an AI end flag XAI is "0". It is assumed herein that by an initialization routine (not illustrated), the AI end flag XAI has been initialized to "0", which indicates that the AI operation has not ended.

If an affirmative determination is made in step 31, that is, if the AI end flag XAI is "0", it is considered that the AI operation has not started, and the ECU 15 determines in step 32 whether an AI execution flag XAIs is "0". It is assumed herein that by an initialization routine (not illustrated), the AI execution flag XAIs has been initialized to "0", which indicates that the AI operation is not being executed.

If an affirmative determination is made in step 32, that is, if the AI execution flag XAIs is "0", it is considered that the AI is not being executed, and the ECU 15 determines in step 33 whether a predetermined time (A seconds) has elapsed following the engine startup.

If an affirmative determination is made in step 33, that is, if the time of A seconds has elapsed following the engine startup, the ECU 15 outputs an AI-on command in step 331. Subsequently in step 332, the ECU 15 sets the AI execution flag XAIs to "1" indicating that the AI is being executed. After that, the ECU 15 ends this routine.

In the case where a negative determination is made in step 30, that is, the present time is not immediately following a cold engine startup, or in the case where a negative determination is made in step 31, that is, the AI end flag XAI is "1", (i.e., the AI has ended), or in the case where a negative determination is made in step 33 (that is, the time of A seconds has not elapsed following the engine startup), the ECU 15 proceeds to step 301, in which an AI-off command is output. After that, the ECU 15 ends this routine.

If a negative determination is made in step 32, that is, if the AI execution flag XAIs is "1" indicating that the AI is being executed, the ECU 15 proceeds to step 34, in which the ECU 15 inputs an engine intake air amount accumulated value ΣGa during the AI operation.

The degree of warm-up of the catalyst 134 can be determined from the temperature of the catalyst. However, there exists no appropriate sensor that is able to measure temperature in a broad range of normal temperature (during a stop of engine) to 1000 degrees (during an activated state) with high reliability. The degree of warm-up of the catalyst 134 is considered to have a correlation with the accumulated value of amounts of intake air introduced into the internal combustion engine following the startup of the engine. Therefore, in this embodiment, the degree of warm-up of the catalyst 134 is estimated from the engine intake air amount accumulated value.

The engine intake air amount accumulated value ΣGa during the AI operation can be computed by accumulating the amounts of intake air detected by the built-in air flow meter 1110 of the air filter 111 at predetermined time intervals.

Subsequently to the input of the engine intake air amount accumulated value ΣGa in step 34, the ECU 15 determines in step 35 whether the engine intake air amount accumulated value ΣGa during the AI operation is greater than a predetermined value B.

If an affirmative determination is made in step 35, that is, if the engine intake air amount accumulated value ΣGa is greater than the predetermined value B, it is considered that the warm-up of the catalyst 134 has been completed, and in step 351 the ECU outputs an AI-off command. Subsequently, the ECU 15 sets the AI end flag XAI to "1" in step 352, and then ends this routine.

Conversely, if a negative determination is made in step 35, that is, if the engine intake air amount accumulated value ΣGa is not greater than the predetermined value B, it is considered that the warm-up of the catalyst 134 has not been completed, and in step 36 the ECU 15 executes a during-AI control routine.

Figure 4:
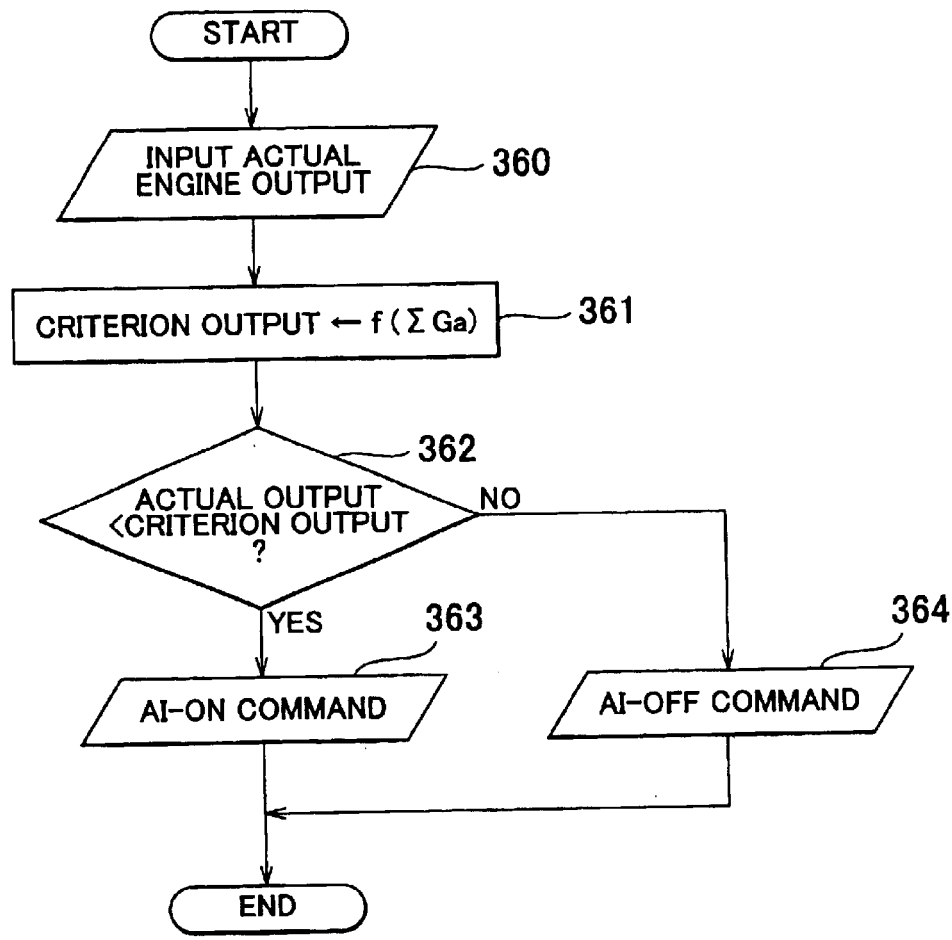
FIG. 4 is a flowchart illustrating a during-AI control routine.

FIG. 4 is a flowchart illustrating the during-AI control routine executed in step 36 of the AI main routine. In step 360 in the during-AI control routine, the ECU 15 inputs a parameter (the throttle valve opening or the amount of intake flow) that indicates the actual output of the internal combustion engine 10. Subsequently in step 361, the ECU 15 computes a criterion output value as a function of the intake air amount accumulated value ΣGa.

Figure 5:
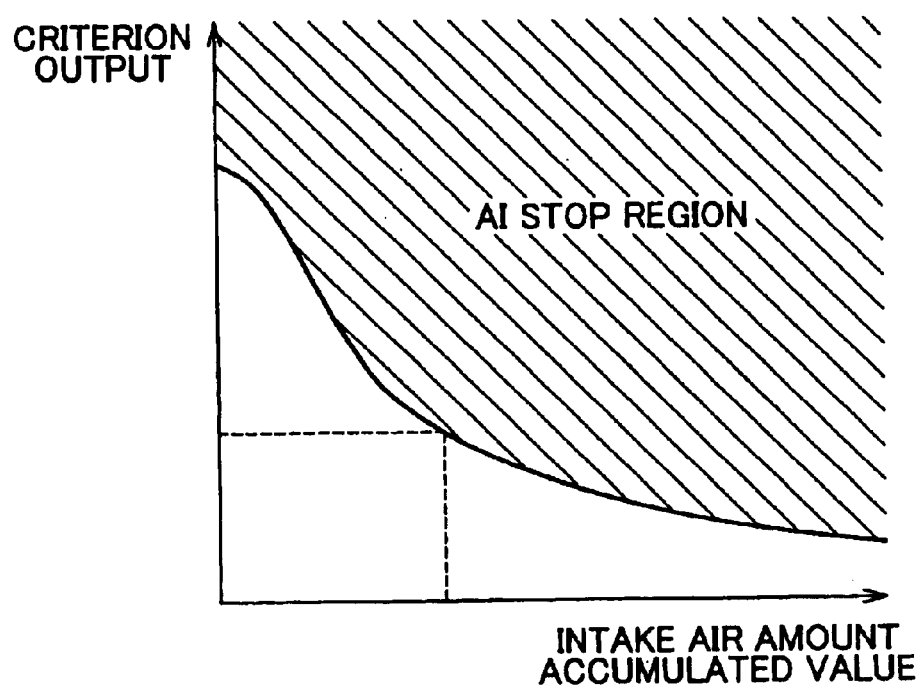
FIG. 5 is a graph indicating a criterion output.

FIG. 5 is a graph indicating the criterion output, where the horizontal axis indicates the intake air amount accumulated value ΣGa and the vertical axis indicates the criterion output.

When the intake air amount accumulated value is small, that is, when the elapsed time following an engine startup is short, there is high possibility that the catalyst has not been warmed up, and therefore the criterion output value for stopping the AI is set great. Conversely, when the intake air amount accumulated value is large, that is, when a considerable amount of time has elapsed following an engine startup, there is high possibility that the catalyst has been warmed up, and therefore the criterion output value for stopping the AI is set small.

If the actual engine output is greater than the criterion output (a hatched region in FIG. 5), the AI is stopped. If the actual engine output is less than the criterion output, the AI operation is continued.

In step 362, the ECU 15 determines whether the actual output of the engine input in step 360 is less than the criterion output value computed in step 361.

If an affirmative determination is made in step 362, that is, if the actual engine output is less than the criterion output value, the ECU 15 outputs the AI-on command in step 363, and then ends this routine.

Conversely, if a negative determination is made in step 362, that is, if the actual engine output is greater than or equal to the criterion output value, the ECU 15 outputs the AI-off command in step 364, and then ends this routine.

Figure 6:
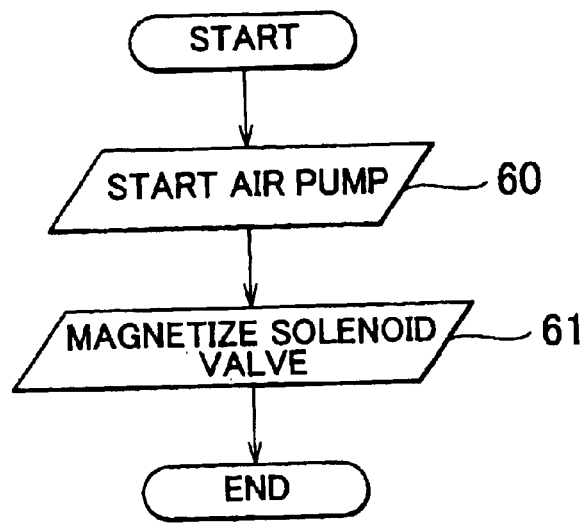
FIG. 6 is a flowchart illustrating an AI starting routine.

FIG. 6 is a flowchart illustrating an AI starting routine executed upon output of the AI-on command. In step 60, electric power starts to be supplied to an electric motor for driving the electrically driven air pump 142, thereby starting to operate the electrically driven air pump 142. In step 61, the solenoid valve 146 is magnetized to supply negative pressure from the intake manifold 114 to the air switching valve 143. As a result, atmospheric air is taken in via the secondary air filter 141 so that secondary air is injected into the exhaust branch pipes 131 via the secondary air piping 144 and the secondary air injection pipes 145. Therefore, the oxygen concentration in exhaust gas increases, so that the oxidative reactions on the catalyst 134 accelerate. Then, heat produced by the oxidative reactions accelerates the warm-up of the catalyst 134.

Figure 7:
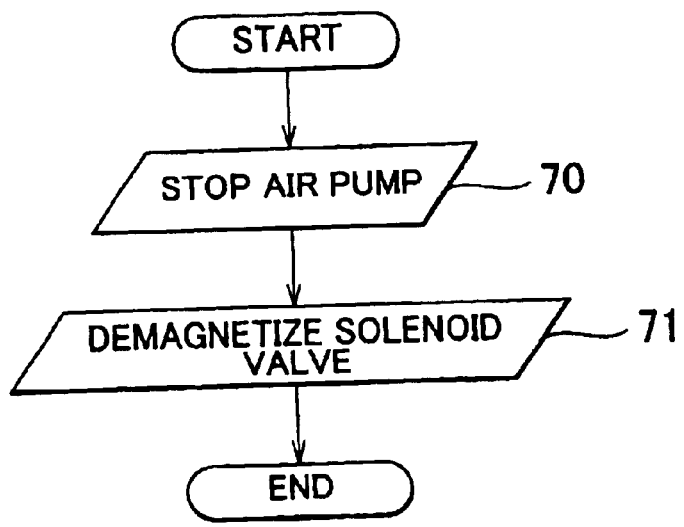
FIG. 7 is a flowchart illustrating an AI stopping routine.

FIG. 7 is a flowchart illustrating an AI stopping routine executed upon output of the AI-off command. In step 70, the supply of electric power to the motor for driving the electrically driven air pump 142 is discontinued so as to stop the electrically driven air pump 142. In step 71, the solenoid valve 146 is demagnetized to stop the supply of negative pressure from the intake manifold 114 to the air switching valve 143. Therefore, the supply of secondary air to the exhaust branch pipes 131 stops.

Figure 8:
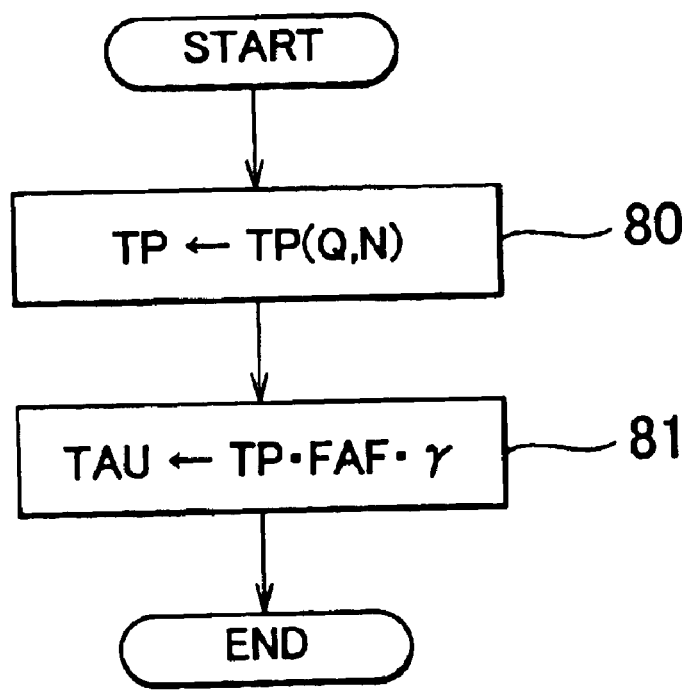
FIG. 8 is a flowchart illustrating a fuel injection routine.

FIG. 8 is a flowchart illustrating a fuel injection routine executed by the ECU 15 during execution of the AI. The fuel injection routine is executed as an interrupt process that is executed at every predetermined rotational angle of a crankshaft of the internal combustion engine.

In step 80, a basic fuel injection duration TP is calculated as a function of the intake air amount Q detected by the air flow meter and the revolution speed N of the internal combustion engine. Subsequently in step 81, a fuel injection duration TAU is calculated as in the following expression:

$$TAU \leftarrow TP \cdot FAF \cdot \gamma$$

where FAF represents a feedback correction factor, and is equal to "1.0" during the AI operation because during the AI the air-fuel ratio is open-loop controlled, and γ represents, for example, a correction factor corresponding to the amount of increase at the time of engine startup.

In the foregoing embodiment, the predetermined value B and the criterion output calculation graph are uniquely defined. However, since a longer time is needed for the warm-up of the catalyst as the cooling water temperature prior to the startup of the engine is lower, the predetermined value B and the criterion output calculation graph may be changed in accordance with the pre-startup cooling water temperature.

According to the internal combustion engine exhaust gas purification device of the embodiment, if the engine output increases during the injection of secondary air, degradation of emissions can be curbed by stopping the injection of secondary air and therefore allowing purification of exhaust gas on the catalyst provided that the warm-up of the catalyst has progressed to a certain degree.

Still further, because the injection of secondary air is stopped when the output of the internal combustion engine increases, the temperature of the catalyst is prevented from increasing sharply, thus enabling excessive heating of the catalyst to be curbed.

While the invention has been described with reference to what are presently considered to be preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less or only a single element, are also within the spirit and scope of the invention.

What is claimed is:

1. An exhaust gas purification device of an engine, comprising:
    a catalyst disposed in an exhaust gas pipe of the engine for purification of an exhaust gas;
    a secondary air injection device that injects a secondary air into the exhaust gas pipe upstream of the catalyst so as to accelerate a warm-up of the catalyst at a time of a startup of the engine;
    a controller that:
        determining a degree of the warm-up of the catalyst;
        calculates a criterion output based on the determined degree of the warm-up of the catalyst;
        detects an output of the engine; and
        stops injection of the secondary air with an injection stop device provided that:
            the determined degree of the warm-up is greater than or equal to a predetermined criterion degree of the warm-up; and
            the detected output of the engine is greater than or equal to the calculated criterion output.

2. The exhaust gas purification device according to claim 1, wherein the controller determines the degree of the warm-up of the catalyst by determining an accumulated value of an amount of flow of a primary air taken into the engine after the startup of the engine.

3. The exhaust gas purification device according to claim 1, wherein the controller detects the output of the engine based on a degree of opening of a throttle valve.

4. The exhaust gas purification device according to claim 1, wherein the controller detects the output of the engine based on an amount of intake air taken into the engine.

5. The exhaust gas purification device according to claim 1, further comprising:
    a cooling water temperature detector that detects a temperature of a cooling water of the engine; and
    wherein the controller corrects the criterion output and the criterion degree of the warm-up based on the temperature of the cooling water.

6. The exhaust gas purification device according to claim 1, wherein the engine is an internal combustion engine.

7. A method for purifying an exhaust gas for an engine, comprising:
    purifying the exhaust gas with a catalyst disposed in an exhaust gas pipe of the engine;
    injecting a secondary air into the exhaust gas pipe so as to accelerate a warm-up of the catalyst at a time of a startup of the engine;
    detecting a degree of the warm-up of the catalyst;
    calculating a criterion output based on the degree of the warm-up detected;
    detecting an output of the engine; and
    stopping injection of the secondary air provided that:
        the detected degree of the warm-up is greater than or equal to a predetermined criterion degree of the warm-up; and
        the detected output of the engine is greater than or equal to the calculated criterion output.

8. The method according to claim 7, wherein the detected degree of the warm-up is based on an accumulated value of an amount of flow of a primary air taken into the engine after the startup of the engine.

9. The method according to claim 7, further comprising:
    detecting a temperature of a cooling water of the engine; and
    correcting the criterion output and the criterion degree of the warm-up based on the detected temperature of the cooling water.

* * * * *